United States Patent
Yamazaki et al.

(10) Patent No.: US 9,491,453 B2
(45) Date of Patent: Nov. 8, 2016

(54) MEASUREMENT POSITION DETERMINATION APPARATUS, IMAGE DISPLAY SYSTEM, AND NON-TRANSITORY COMPUTER READABLE MEDIUM

(71) Applicant: FUJI XEROX CO., LTD., Minato-ku, Tokyo (JP)

(72) Inventors: Chizuru Yamazaki, Kanagawa (JP); Toshihiro Iwafuchi, Kanagawa (JP); Makoto Fujio, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 356 days.

(21) Appl. No.: 14/038,343

(22) Filed: Sep. 26, 2013

(65) Prior Publication Data

US 2014/0210842 A1 Jul. 31, 2014

(30) Foreign Application Priority Data

Jan. 31, 2013 (JP) .................... 2013-016942

(51) Int. Cl.
*G06T 7/00* (2006.01)
*H04N 17/04* (2006.01)
*H04N 17/02* (2006.01)
*G01J 3/50* (2006.01)

(52) U.S. Cl.
CPC .......... *H04N 17/04* (2013.01); *G01J 3/506* (2013.01); *H04N 17/02* (2013.01); *G06T 7/0044* (2013.01); *G09G 2320/0693* (2013.01)

(58) Field of Classification Search
None
See application file for complete search history.

(56) References Cited

U.S. PATENT DOCUMENTS 8,736,840 B1* 5/2014 Ten .................... G01J 3/46 356/401
2012/0013632 A1* 1/2012 Yamamoto ............. G09G 5/00 345/589

FOREIGN PATENT DOCUMENTS

JP 2009-175355 A 8/2009

\* cited by examiner

*Primary Examiner* — Jon Chang
(74) *Attorney, Agent, or Firm* — Sughrue Mion, PLLC

(57) ABSTRACT

A measurement position determination apparatus includes a creation unit, a measurement unit, and a determination unit. The creation unit creates display image data for displaying a reference image and a comparison image on a display screen. The reference image includes one achromatic image, and the comparison image is formed by arranging two or more images including a chromatic image. The measurement unit measures the reference image and the comparison image in a sub-area on the display screen. The reference image and the comparison image are displayed on the display screen in accordance with the display image data. The determination unit determines a measurement position of the measurement unit on the display screen in accordance with measurement results obtained by measurement of the reference image and the comparison image using the measurement unit.

10 Claims, 14 Drawing Sheets

| AREA | REFERENCE IMAGE | COMPARISON IMAGE | |
|---|---|---|---|
| | | FIRST COMPARISON IMAGE | SECOND COMPARISON IMAGE |
| A1 | | | R (R=255, G=0, B=0) |
| A2 | | R (R=255, G=0, B=0) | G (R=0, G=255, B=0) |
| A3 | | | B (R=0, G=0, B=255) |
| A4 | | | R (R=255, G=0, B=0) |
| A5 | W (R=255, G=255, B=255) | G (R=0, G=255, B=0) | G (R=0, G=255, B=0) |
| A6 | | | B (R=0, G=0, B=255) |
| A7 | | | R (R=255, G=0, B=0) |
| A8 | | B (R=0, G=0, B=255) | G (R=0, G=255, B=0) |
| A9 | | | B (R=0, G=0, B=255) |

FIG. 7

| DETERMINATION CRITERIA | GRADATION SIGNAL VALUES TO BE USED | | | DETERMINED COLOR |
|---|---|---|---|---|
| HUE H [ ° ] | R | G | B | |
| 0 TO 80 | 255 | 0 | 0 | R |
| 100 TO 180 | 0 | 255 | 0 | G |
| 260 TO 340 | 0 | 0 | 255 | B |

FIG. 8A

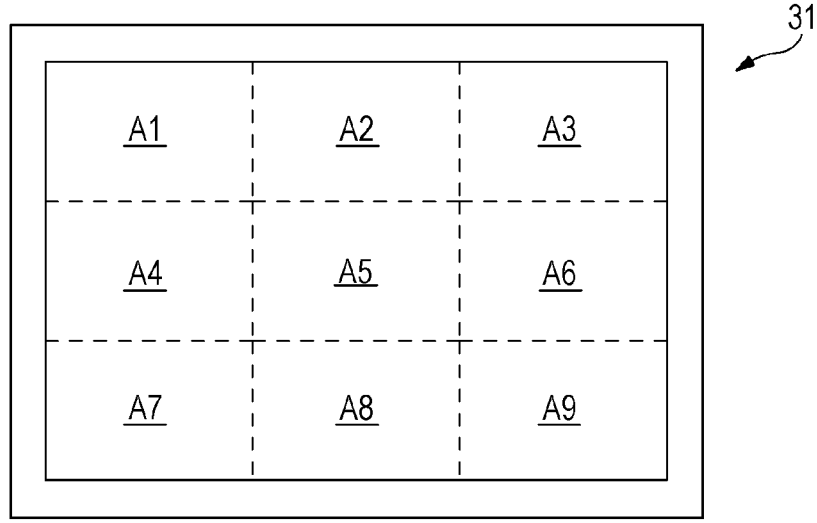

FIG. 8B

| AREA | REFERENCE IMAGE | COMPARISON IMAGE | |
|---|---|---|---|
| | | FIRST COMPARISON IMAGE | SECOND COMPARISON IMAGE |
| A1 | $W\begin{pmatrix}R=255\\G=255\\B=255\end{pmatrix}$ | $R\begin{pmatrix}R=255\\G=0\\B=0\end{pmatrix}$ | $R\begin{pmatrix}R=255\\G=0\\B=0\end{pmatrix}$ |
| A2 | | | $G\begin{pmatrix}R=0\\G=255\\B=0\end{pmatrix}$ |
| A3 | | | $B\begin{pmatrix}R=0\\G=0\\B=255\end{pmatrix}$ |
| A4 | | $G\begin{pmatrix}R=0\\G=255\\B=0\end{pmatrix}$ | $R\begin{pmatrix}R=255\\G=0\\B=0\end{pmatrix}$ |
| A5 | | | $G\begin{pmatrix}R=0\\G=255\\B=0\end{pmatrix}$ |
| A6 | | | $B\begin{pmatrix}R=0\\G=0\\B=255\end{pmatrix}$ |
| A7 | | $B\begin{pmatrix}R=0\\G=0\\B=255\end{pmatrix}$ | $R\begin{pmatrix}R=255\\G=0\\B=0\end{pmatrix}$ |
| A8 | | | $G\begin{pmatrix}R=0\\G=255\\B=0\end{pmatrix}$ |
| A9 | | | $B\begin{pmatrix}R=0\\G=0\\B=255\end{pmatrix}$ |

FIG. 10

| FIRST DETECTION IMAGE | SECOND DETECTION IMAGE | DETERMINATION RESULTS |
|---|---|---|
| R | R | A1 |
| R | G | A2 |
| R | B | A3 |
| G | R | A4 |
| G | G | A5 |
| G | B | A6 |
| B | R | A7 |
| B | G | A8 |
| B | B | A9 |
| R | R&G(Y) | A1 - A2 |
| R | G&B(C) | A2 - A3 |
| G | R&G(Y) | A4 - A5 |
| G | G&B(C) | A5 - A6 |
| B | R&G(Y) | A7 - A8 |
| B | G&B(C) | A8 - A9 |
| R&G(Y) | R | A1 - A4 |
| R&G(Y) | G | A2 - A5 |
| R&G(Y) | B | A3 - A6 |
| G&B(C) | R | A4 - A7 |
| G&B(C) | G | A5 - A8 |
| G&B(C) | B | A6 - A9 |
| R&G(Y) | R&G(Y) | A1 - A2 - A4 - A5 |
| R&G(Y) | G&B(C) | A2 - A3 - A5 - A6 |
| G&B(C) | R&G(Y) | A4 - A5 - A7 - A8 |
| G&B(C) | G&B(C) | A5 - A6 - A8 - A9 |

FIG. 11

| DETERMINATION CRITERIA | | GRADATION SIGNAL VALUES TO BE USED | | |
| --- | --- | --- | --- | --- |
| CHROMA C | HUE H [°] | R | G | B |
| $C > \dfrac{\text{MAXIMUM VALUE}}{2}$ | 0 TO 90 | 255 | 0 | 0 |
| $C > \dfrac{\text{MAXIMUM VALUE}}{2}$ | 90 TO 180 | 0 | 255 | 0 |
| $C > \dfrac{\text{MAXIMUM VALUE}}{2}$ | 180 TO 360 | 0 | 0 | 255 |
| $C \leq \dfrac{\text{MAXIMUM VALUE}}{2}$ | 0 TO 90 | 64 | 0 | 0 |
| $C \leq \dfrac{\text{MAXIMUM VALUE}}{2}$ | 90 TO 180 | 0 | 64 | 0 |
| $C \leq \dfrac{\text{MAXIMUM VALUE}}{2}$ | 180 TO 360 | 0 | 0 | 64 |

FIG. 12

| DETERMINATION CRITERIA | GRADATION SIGNAL VALUES TO BE USED | | | DETERMINED COLOR |
|---|---|---|---|---|
| HUE H [ ° ] | R | G | B | |
| 0 TO 80 | 255 | 0 | 0 | R |
| 100 TO 180 | 0 | 255 | 0 | G |

| AREA | REFERENCE IMAGE | COMPARISON IMAGE |
|---|---|---|
| A1 |  | G (R=0, G=255, B=0) |
| A2 |  | G (R=0, G=255, B=0) |
| A3 |  | G (R=0, G=255, B=0) |
| A4 | W (R=255, G=255, B=255) | G (R=0, G=255, B=0) |
| A5 |  | R (R=255, G=0, B=0) |
| A6 |  | G (R=0, G=255, B=0) |
| A7 |  | G (R=0, G=255, B=0) |
| A8 |  | G (R=0, G=255, B=0) |
| A9 |  | G (R=0, G=255, B=0) |

MEASUREMENT POSITION DETERMINATION APPARATUS, IMAGE DISPLAY SYSTEM, AND NON-TRANSITORY COMPUTER READABLE MEDIUM

CROSS-REFERENCE TO RELATED APPLICATIONS

This application is based on and claims priority under 35 USC 119 from Japanese Patent Application No. 2013-016942 filed Jan. 31, 2013.

BACKGROUND

Technical Field

The present invention relates to a measurement position determination apparatus, an image display system, and a non-transitory computer readable medium.

SUMMARY

According to an aspect of the invention, there is provided a measurement position determination apparatus including a creation unit, a measurement unit, and a determination unit. The creation unit creates display image data for displaying a reference image and a comparison image on a display screen. The reference image includes one achromatic image, and the comparison image is formed by arranging two or more images including a chromatic image. The measurement unit measures the reference image and the comparison image in a sub-area on the display screen. The reference image and the comparison image are displayed on the display screen in accordance with the display image data. The determination unit determines a measurement position of the measurement unit on the display screen in accordance with measurement results obtained by measurement of the reference image and the comparison image using the measurement unit.

BRIEF DESCRIPTION OF THE DRAWINGS

An exemplary embodiment of the present invention will be described in detail based on the following figures, wherein:

FIG. 7 illustrates an example of a setting table that is used when the characteristics to be used to determine a measurement position are not defined;

FIGS. 8A and 8B illustrate an example of position-detection image data created in accordance with determination criteria and gradation signal values illustrated in FIG. 7;

FIG. 10 illustrates an example of a color-determination table that is used to determine a measurement position;

FIG. 11 illustrates an example of a setting table that is used when the characteristics to be used to determine a measurement position are defined;

FIG. 12 illustrates an example of a setting table that is used to determine whether the color measurement device is performing measurement of a measurement position;

DETAILED DESCRIPTION

An exemplary embodiment of the present invention will be described with reference to the accompanying drawings.

Figure 1:
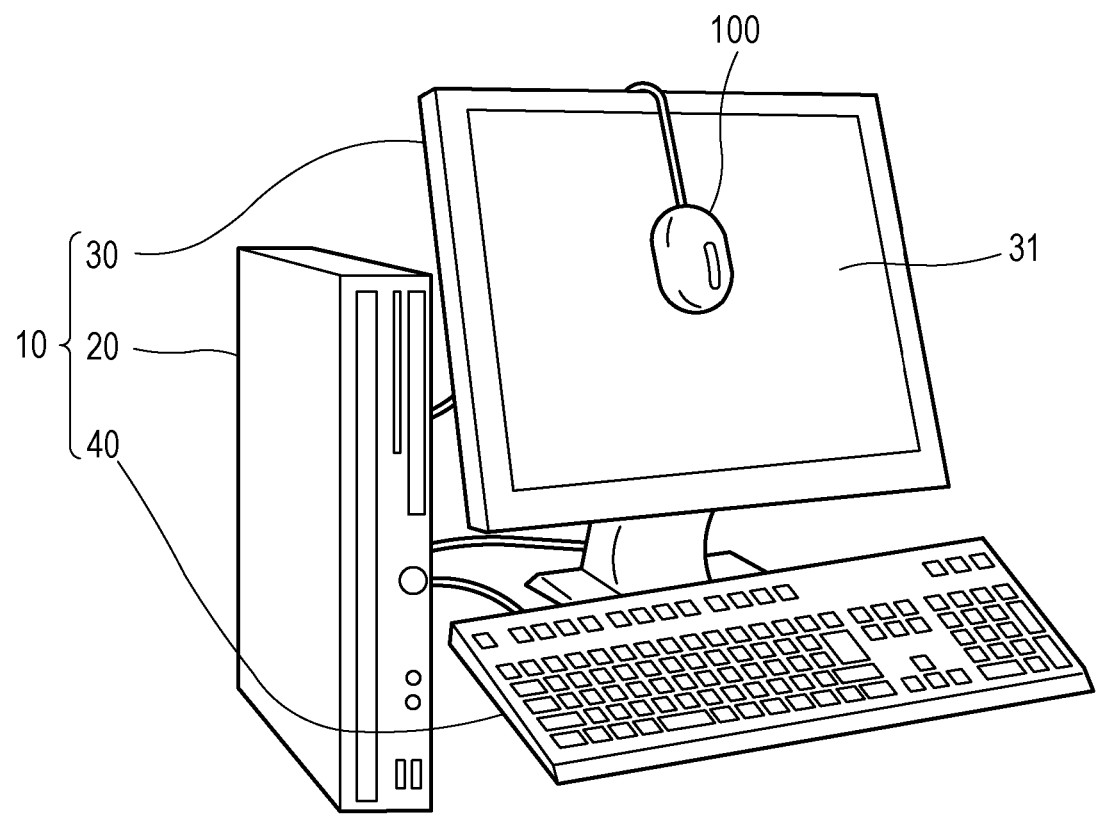
FIG. 1 illustrates an example configuration of an image display system according to an exemplary embodiment of the present invention.

FIG. 1 illustrates an example configuration of an image display system 10 according to this exemplary embodiment.

The image display system 10 includes a computer device 20 configured to perform processing such as creating image data for display, a display device 30 configured to display an image based on the image data created by the computer device 20 on a display screen 31, and an input device 40 configured to receive an input to the computer device 20 and the like.

In the image display system 10, the computer device 20 and the display device 30 are connected via Digital Visual Interface (DVI), and the computer device 20 and the input device 40 are connected via Universal Serial Bus (USB). The computer device 20 and the display device 30 may be connected via High-Definition Multimedia Interface (HDMI) or DisplayPort instead of DVI.

The computer device 20 may be a general-purpose personal computer. The computer device 20 is configured to perform processing such as creating image data by causing various pieces of application software to operate under the management of an operating system (OS).

The display device 30, which serves as an example of a display, may be a device having a function for displaying an image using an additive technique, such as a liquid crystal display for a personal computer (PC), a liquid crystal television display, or a projector. Accordingly, the display method of the display device 30 is not limited to a liquid crystal method. In FIG. 1, the display device 30 includes the display screen 31 because the display device 30 is a liquid crystal display for a PC. For example, in a case where the display device 30 is a projector, the display screen 31 may be a screen provided outside the display device 30.

Examples of the input device 40 include a keyboard device illustrated in FIG. 1, and a mouse device (not illustrated).

In the image display system 10, for example, an image based on display image data that is created using the input device 40 and the computer device 20 is displayed on the display screen 31 of the display device 30. It is to be noted here that, in a case where product design is carried out using application software operating on the computer device 20, it is required that an image be displayed on the display screen 31 of the display device 30 with accurate colors. To this end, the image display system 10 is configured to cause the display device 30 to display an image based on image data for color measurement (hereinafter referred to as "color-measurement image data") that is created using the computer device 20 (an image based on color-measurement image data is hereinafter referred to as a "color-measurement image") and to perform a calibration operation for calibrating the colors to be displayed by the display device 30 in accordance with a result of reading the color-measurement image displayed on the display device 30.

In FIG. 1, a color measurement device 100 is illustrated along with the image display system 10. The color measurement device 100 is used for the calibration operation described above, and is also used to read the color-measurement image displayed on the display screen 31 of the display device 30.

The color measurement device 100, which serves as an example of a measurement unit, includes a sensor (not illustrated) configured to read an image using three colors, red (R), green (G), and blue (B), and is configured to measure the color-measurement image displayed on the display screen 31 in full color. In the example illustrated in FIG. 1, the color measurement device 100 is hung in front of the housing of the display device 30, which is a liquid crystal display for a PC, and is a contact color measurement device configured such that a light receiving surface thereof including the sensor is brought into contact with the display screen 31. In the illustrated example, the color measurement device 100 and the computer device 20 are connected via USB. The color measurement device 100 is arranged on the display screen 31 using a hanging holder (not illustrated). For example, in a case where the display device 30 is a projector, the color measurement device 100 may be a non-contact color measurement device configured to capture a color-measurement image projected onto a screen using the projector at a position away from the screen.

In this exemplary embodiment, the color measurement device 100 is configured to read a sub-area that accounts for at least one half or less of the entire display area of the display screen 31.

Figure 2:
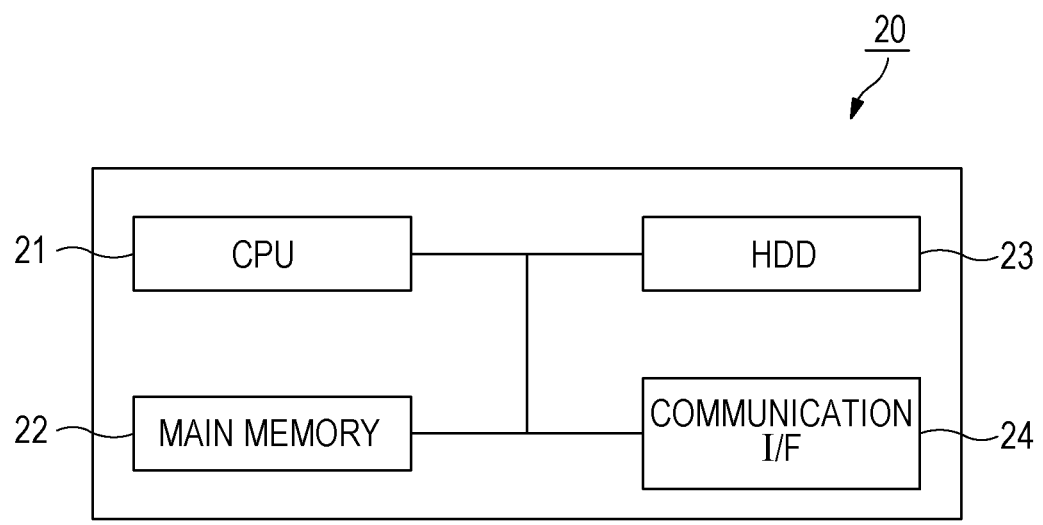
FIG. 2 illustrates a hardware configuration of a computer device.

FIG. 2 illustrates a hardware configuration of the computer device 20.

As described above, the computer device 20 may be implemented as a personal computer or the like. As illustrated in FIG. 2, the computer device 20 includes a central processing unit (CPU) 21, which serves as a calculation unit, and a main memory 22 and a hard disk drive (HDD) 23, which serve as storage units. The CPU 21 executes various programs such as an OS and application software. The main memory 22 may be a storage area for storing various programs, data used for the execution of the programs, and so forth. The HDD 23 may be a storage area for storing data input to the various programs, data output from the various programs, and so forth. The computer device 20 further includes a communication interface (I/F) 24 configured to communicate with external devices including the input device 40 and the display device 30.

Figure 3:
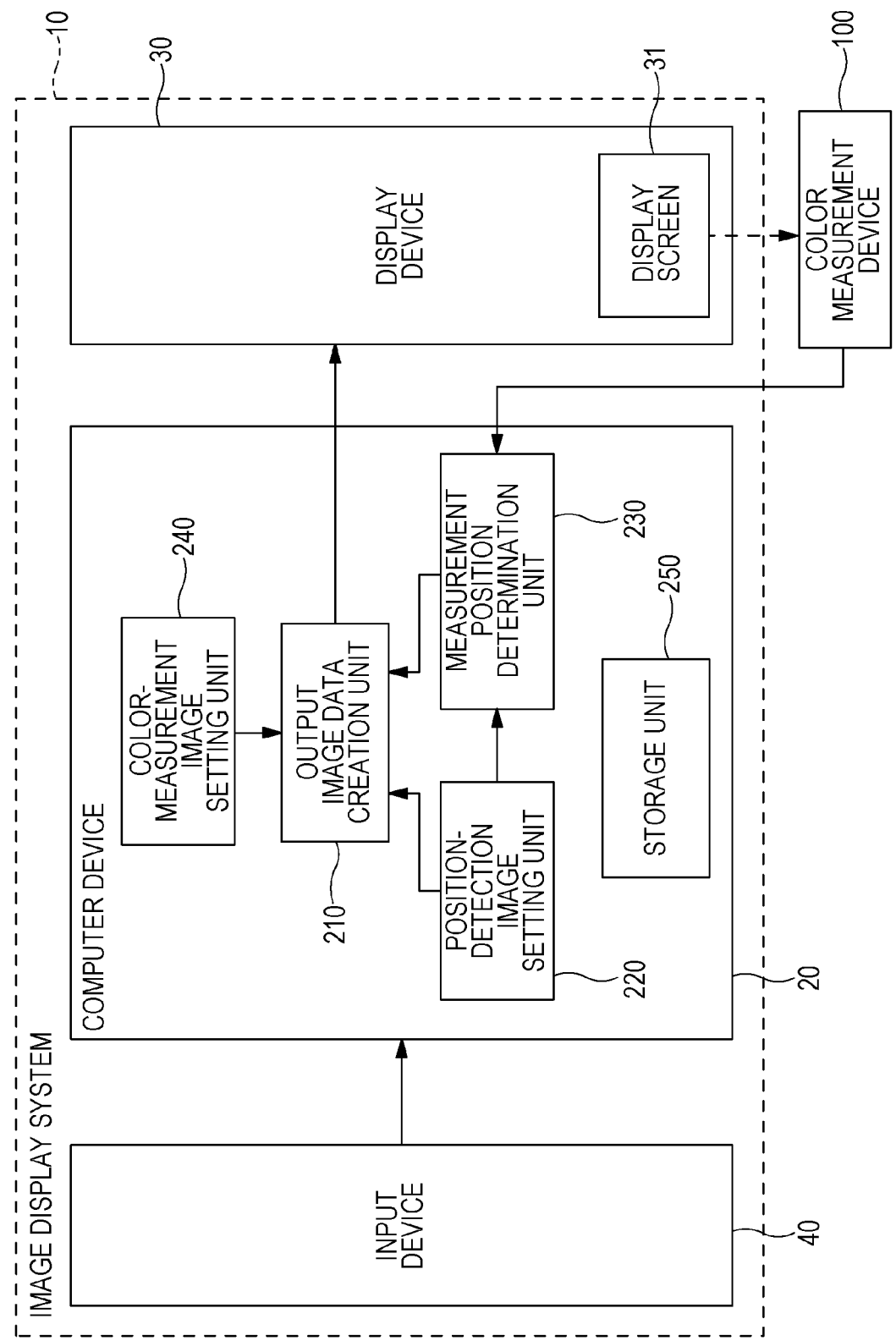
FIG. 3 illustrates an example functional configuration of the computer device.

FIG. 3 illustrates an example functional configuration of the computer device 20 according to this exemplary embodiment.

The computer device 20 includes an output image data creation unit 210, a position-detection image setting unit 220, a measurement position determination unit 230, a color-measurement image setting unit 240, and a storage unit 250.

The output image data creation unit 210 creates output image data to be displayed on the display screen 31 using the display device 30, and outputs the created output image data to the display device 30.

The position-detection image setting unit 220 performs settings of a position-detection image to obtain setting information, and outputs the setting information to the output image data creation unit 210. The position-detection image is used in a position detection operation executed as a pre-processing operation prior to the calibration operation described above for detecting the measurement position of the color measurement device 100 on the display screen 31.

The measurement position determination unit 230 determines the measurement position of the color measurement device 100 on the display screen 31 in accordance with a result of reading the position-detection image displayed on the display screen 31 using the color measurement device 100, and outputs information concerning the determined measurement position to the output image data creation unit 210.

The color-measurement image setting unit 240 performs settings of a color-measurement image to obtain setting information, and outputs the setting information to the output image data creation unit 210. The color-measurement image is used in the calibration operation described above.

The storage unit 250 stores various data to be used for the processes performed by the output image data creation unit 210, the position-detection image setting unit 220, the measurement position determination unit 230, and the color-measurement image setting unit 240.

In this exemplary embodiment, the position-detection image setting unit 220 and the output image data creation unit 210 have a function of a creation unit, and the measurement position determination unit 230 has a function of a determination unit.

The functions of the elements included in the computer device 20 illustrated in FIG. 3, namely, the output image data creation unit 210, the position-detection image setting unit 220, the measurement position determination unit 230, the color-measurement image setting unit 240, and the storage unit 250, are implemented by the cooperation of software and hardware resources. Specifically, the CPU 21 in the computer device 20 illustrated in FIG. 2 loads a program implementing the individual functions of the respective units into the main memory 22 from a storage device, for example, the HDD 23, and implements the individual functions. Storage devices such as the HDD 23 and the main memory 22 implement the functions of the storage unit 250.

A description will now be given of the position detection operation of the color measurement device 100, which is executed as a pre-processing operation prior to the calibration operation.

Figure 4:
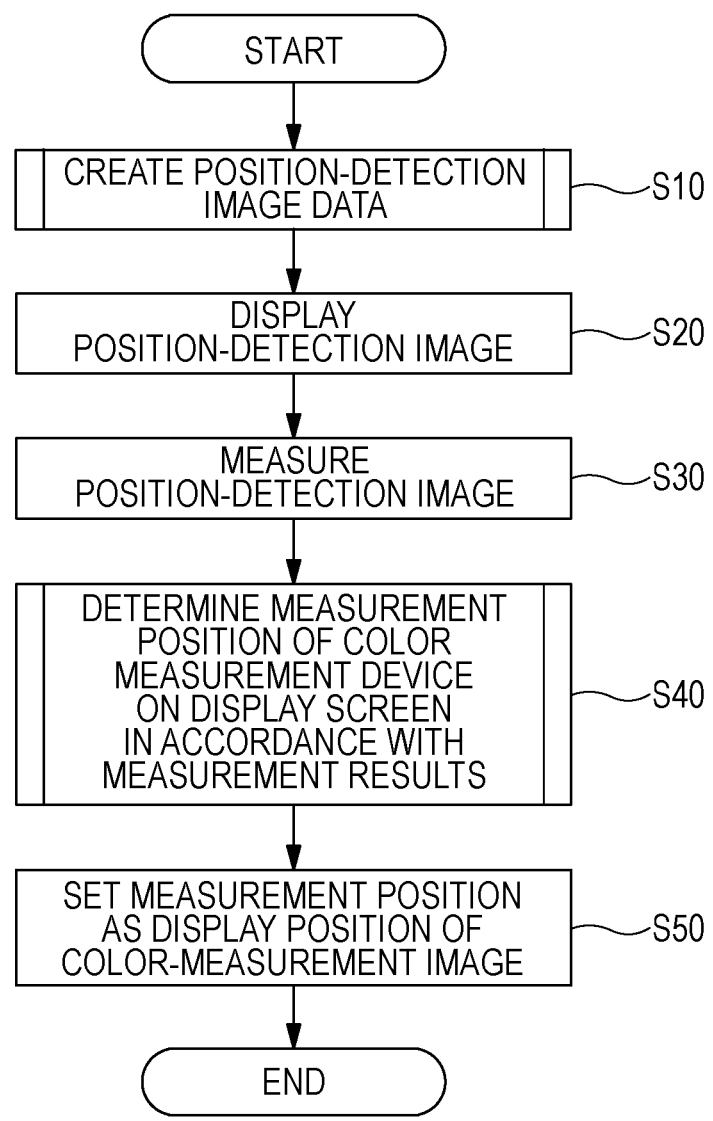
FIG. 4 is a flowchart illustrating a processing procedure in a position detection operation of a color measurement device.

FIG. 4 is a flowchart illustrating a processing procedure in the position detection operation of the color measurement device 100. Before the position detection operation of the color measurement device 100 begins, the color measurement device 100 is set on the display screen 31 of the display device 30. In this case, it is assumed that the measurement position of the color measurement device 100 on the display screen 31 is not defined.

First, the position-detection image setting unit 220 and the output image data creation unit 210 in the computer device 20 create position-detection image data to be displayed on the display screen 31 using the display device 30 (step S10). The details of the processing of step S10 will be described below.

Then, the display device 30 displays a position-detection image on the display screen 31 in accordance with the position-detection image data created in step S10 and input from the computer device 20 (step S20). The color measurement device 100 measures the position-detection image displayed on the display screen 31 (step S30). For the reason described above, the color measurement device 100 measures an image portion displayed in a sub-area within the position-detection image displayed on the display screen 31. The measurement results of the color measurement device 100 are output to the measurement position determination unit 230 in the computer device 20.

Then, the measurement position determination unit 230 in the computer device 20 determines the measurement position of the color measurement device 100 on the display screen 31 in accordance with the measurement results acquired from the color measurement device 100 (step S40). The details of the processing of step S40 will be described below. Then, the measurement position determination unit 230 sets the measurement position determined in step S40 as the display position of the color-measurement image in the calibration operation subsequent to the position detection operation (step S50), and outputs the set display position to the output image data creation unit 210. Then, the series of processing steps ends.

In the calibration operation subsequent to the position detection operation, the color-measurement image setting unit 240 and the output image data creation unit 210 in the computer device 20 create the color-measurement image data to be displayed on the display screen 31 using the display device 30. In this exemplary embodiment, the output image data creation unit 210 creates the color-measurement image data so that a color-measurement image is displayed at the display position on the display screen 31 which is set in step S50.

Figure 5:
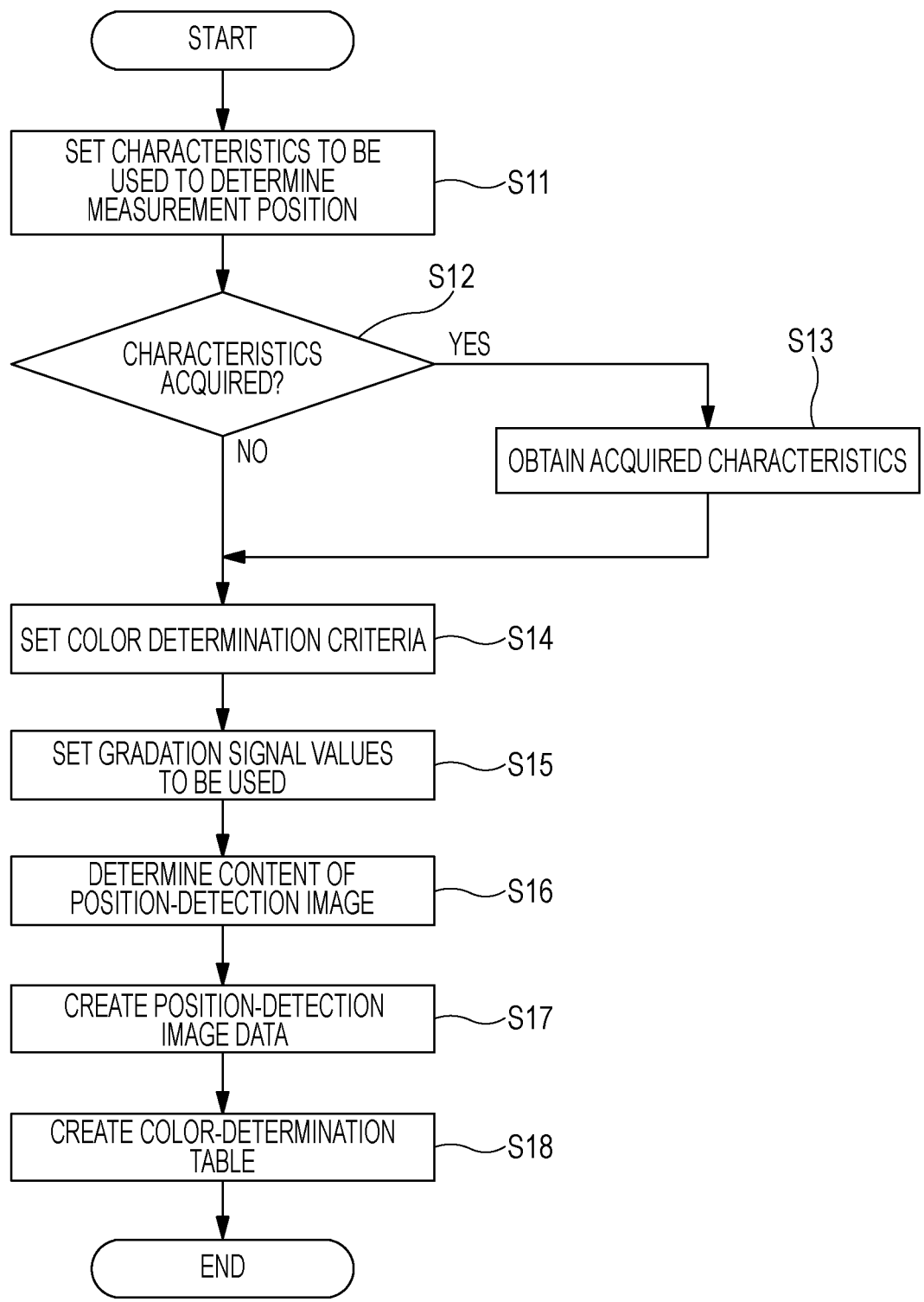
FIG. 5 is a flowchart illustrating the details of the procedure for creating position-detection image data.

FIG. 5 is a flowchart explaining the details of the procedure for creating position-detection image data in step S10 described above.

In the illustrated process, first, the position-detection image setting unit 220 sets the characteristics to be used for the discrimination of colors in the determination of the measurement position in step S40 described above (step S11). Then, the position-detection image setting unit 220 determines whether the characteristics to be used for the discrimination of colors, which are determined in step S11, have been acquired, and more specifically have been stored in the storage unit 250 (step S12). If a negative determination ("NO") is made in step S12, the process proceeds to step S14. If a positive determination ("YES") is made in step S12, the position-detection image setting unit 220 obtains the acquired characteristics from the storage unit 250 (step S13). Then, the process proceeds to step S14.

Then, the position-detection image setting unit 220 sets criteria on which color determination is based (hereinafter referred to as "determination criteria") in accordance with the characteristics set in step S11 and so forth (step S14), and further sets gradation signal values to be used for the creation of position-detection image data with respect to the respective determination criteria set in step S14 (step S15). In this example, the gradation signal values are expressed in 8-bit, or 256-level (0 to 255), representation. Then, the position-detection image setting unit 220 determines the content of the position-detection image to be used in the position detection operation using the gradation signal values set in step S15 (step S16). The position-detection image includes a reference image and a comparison image, which will be described in detail below.

Thereafter, the output image data creation unit 210 creates position-detection image data based on the content of the position-detection image determined in step S16 (step S17), and outputs the created position-detection image data to the display device 30. The position-detection image setting unit 220 further creates a color-determination table to be used for the discrimination of colors in the determination of the measurement position in step S40 described above in accordance with the content of the position-detection image determined in step S16 (step S18), and outputs the created color-determination table to the measurement position determination unit 230.

Figure 6:
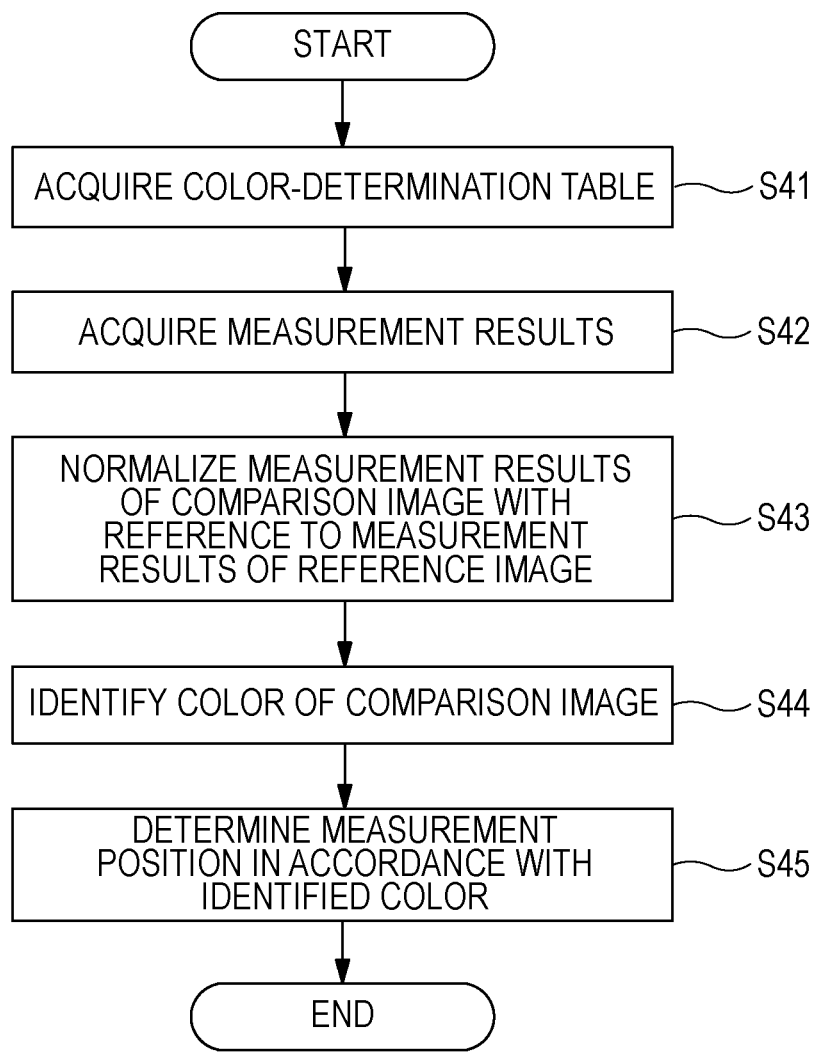
FIG. 6 is a flowchart illustrating the details of the procedure for determining a measurement position.

FIG. 6 is a flowchart explaining the details of the procedure for determining a measurement position in step S40.

First, the measurement position determination unit 230 acquires the color-determination table sent from the position-detection image setting unit 220 in step S18 (step S41). The measurement position determination unit 230 further acquires the measurement results which are obtained by the measurement of the position-detection image displayed on the display screen 31 using the color measurement device 100 in step S30 (step S42).

Then, the measurement position determination unit 230 executes processing to normalize, based on the measurement results acquired in step S42 (step S43), the measurement results of the comparison image with reference to the measurement results of the reference image. Then, the measurement position determination unit 230 identifies the color of the comparison image from the measurement results of the comparison image normalized in step S43 (step S44). Then, the measurement position determination unit 230 determines the measurement position of the color measurement device 100 on the display screen 31 in accordance with the identified color of the comparison image in step S44 (step S45).

The position detection operation of the color measurement device 100 described above will now be described with a specific example.

FIG. 7 illustrates an example of a setting table that is used for the setting of determination criteria, or criteria on which color determination is based, in step S14 and the setting of gradation signal values in step S15 if a negative determination is made in step S12 illustrated in FIG. 5, that is, if the characteristics to be used for the determination of the measurement position are not defined. In the illustrated example, in step S11, hues H (in degrees (°)) are set as characteristics.

In the example illustrated in FIG. 7, there are set three determination criteria for hue H in the ranges of 0 to 80, 100 to 180, and 260 to 340. For the hue H in the range of 0 to 80, the gradation signal values to be used are set as follows: R (red)=255, G (green)=0, and B (blue)=0. In this case, the determined color is red (R). For the hue H in the range of 100 to 180, the gradation signal values to be used are set as follows: R=0, G=255, and B=0. In this case, the determined color is green (G). For the hue H in the range of 260 to 340, the gradation signal values to be used are set as follows: R=0, G=0, and B=255. In this case, the determined color is blue (B).

FIGS. 8A and 8B illustrate an example of position-detection image data created in accordance with the determination criteria and gradation signal values illustrated in FIG. 7. FIG. 8A illustrates the division of the display screen 31 into areas, and FIG. 8B illustrates the configuration of the position-detection image data.

In the illustrated example, as illustrated in FIG. 8A, first, the entire area of the display screen 31 is divided into nine areas of three rows and three columns. In the following description, these nine areas are represented by first to ninth areas A1 to A9. In the illustrated example, furthermore, the first to ninth areas A1 to A9 have the same size (or the same number of pixels), and are arranged in a matrix.

As illustrated in FIG. 8B, the position-detection image used in the illustrated example includes a reference image and a comparison image. In the illustrated example, the comparison image includes two images, that is, a first comparison image and a second comparison image.

Of these images, the reference image is configured such that the gradation signal values (R=255, G=255, B=255) for displaying a white (W) image, which is an example of an achromatic image, are set for the entire area of the display screen 31, that is, the first to ninth areas A1 to A9. In the reference image, therefore, the entire area of the display screen 31 has the same color.

In the first comparison image in the comparison image, in contrast, the gradation signal values (R=255, G=0, B=0) for displaying a red (R) color are set for the first to third areas A1 to A3 that are consecutive in the horizontal direction on the display screen 31, the gradation signal values (R=0, G=255, B=0) for displaying a green (G) color are set for the fourth to sixth areas A4 to A6 that are located below the first to third areas A1 to A3 and that are consecutive in the horizontal direction on the display screen 31, and the gradation signal values (R=0, G=0, B=255) for displaying a blue (B) color are set for the seventh to ninth areas A7 to A9 that are located below the fourth to sixth areas A4 to A6 and that are consecutive in the horizontal direction on the display screen 31. In the first comparison image, therefore, the entire area of the display screen 31 has multiple (in this example, three) different chromatic colors (in this example, red (R), green (G), and blue (B)).

In the second comparison image in the comparison image, the gradation signal values (R=255, G=0, B=0) for displaying a red (R) color are set for the first, fourth, and seventh areas A1, A4, and A7 that are consecutive in the vertical direction on the display screen 31, the gradation signal values (R=0, G=255, B=0) for displaying a green (G) color are set for the second, fifth, and eighth areas A2, A5, and A8 that are located on one side (in FIG. 8A, right side) of the first, fourth, and seventh areas A1, A4, and A7, respectively, and that are consecutive in the vertical direction on the display screen 31, and the gradation signal values (R=0, G=0, B=255) for displaying a blue (B) color are set for the third, sixth, and ninth areas A3, A6, and A9 that are located on one side (in FIG. 8A, right side) of the second, fifth, and eighth areas A2, A5, and A8, respectively, and that are consecutive in the vertical direction on the display screen 31. In the second comparison image, therefore, the entire area of the display screen 31 also has multiple (in this example, three) different chromatic colors (in this example, red (R), green (G), and blue (B)).

Figure 9A:
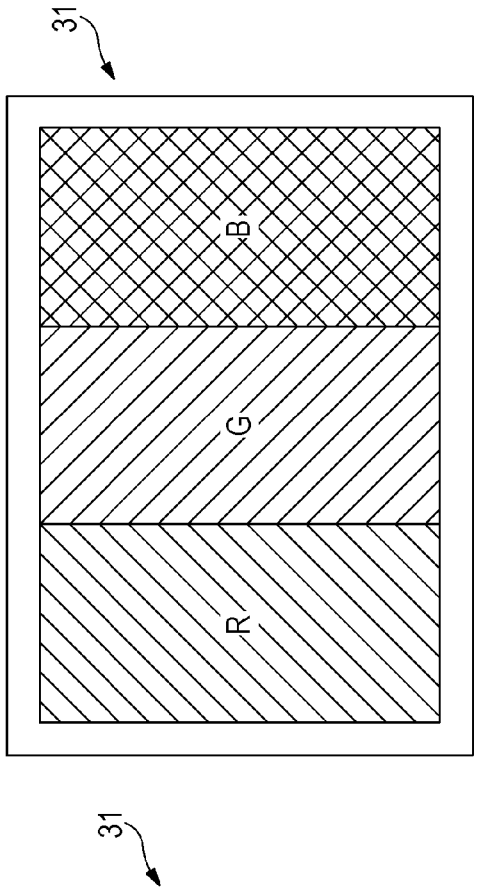
FIGS. 9A to 9D illustrate position-detection images displayed on a display screen of a display device in accordance with the position-detection image data illustrated in FIG. 8B.
Figure 9B:
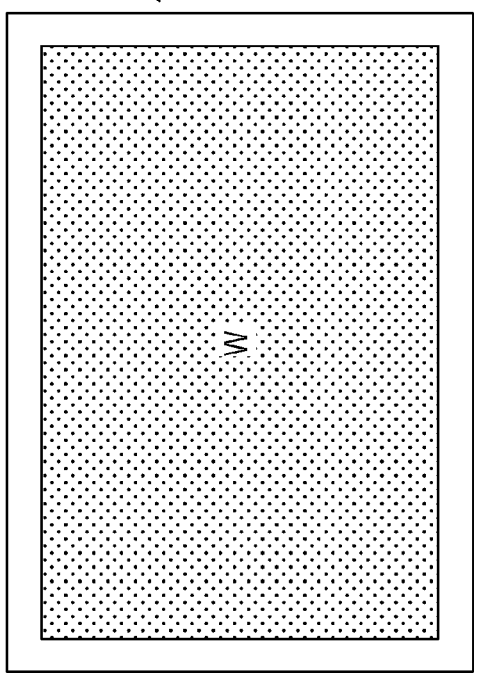
Figure 9C:
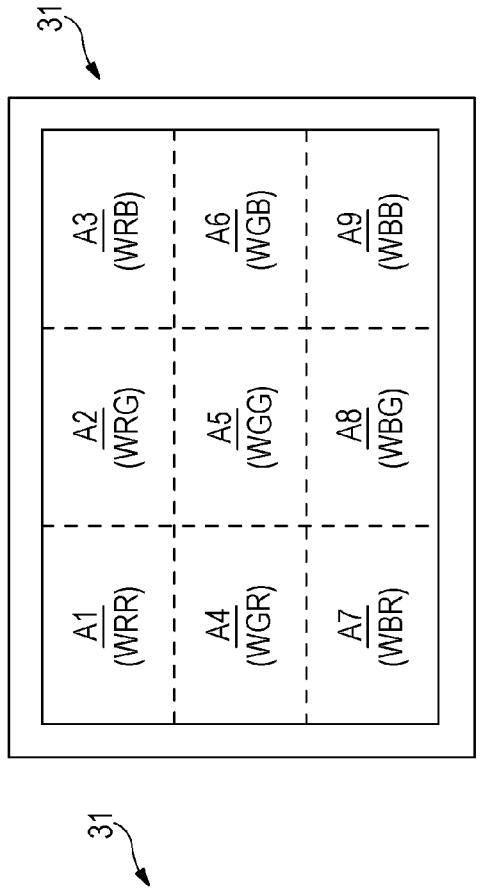
Figure 9D:
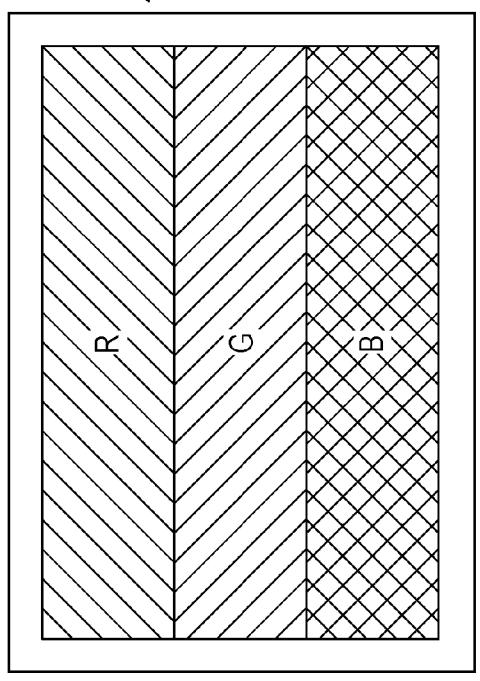

FIGS. 9A to 9D illustrate position-detection images to be displayed on the display screen 31 of the display device 30 in step S20 in accordance with the position-detection image data illustrated in FIG. 8B. FIG. 9A illustrates the reference image to be displayed on the display screen 31, FIG. 9B illustrates the first comparison image to be displayed on the display screen 31, and FIG. 9C illustrates the second comparison image to be displayed on the display screen 31. FIG. 9D illustrates the relationships between the first to ninth areas A1 to A9 of the display screen 31 and the colors of the images displayed in the respective areas.

In the illustrated example, the display device 30 displays the reference image illustrated in FIG. 9A, the first comparison image illustrated in FIG. 9B, and the second comparison image illustrated in FIG. 9C on the display screen 31, in this order, in accordance with the position-detection image data acquired from the computer device 20. The images may be displayed in different order.

With the sequential display of the reference image illustrated in FIG. 9A, the first comparison image illustrated in FIG. 9B, and the second comparison image illustrated in FIG. 9C on the display screen 31 using the display device 30, the images of the respective colors are sequentially displayed in the first to ninth areas A1 to A9 of the display screen 31 in the manner illustrated in FIG. 9D.

In the first area A1, a white (W) image in the reference image, a red (R) image in the first comparison image, and a red (R) image in the second comparison image are displayed in this order (indicated by "WRR" in FIG. 9D). In the second area A2, a white (W) image in the reference image, a red (R) image in the first comparison image, and a green (G) image in the second reference image are displayed in this order (indicated by "WRG" in FIG. 9D). In the third area A3, a white (W) image in the reference image, a red (R) image in the first comparison image, and a blue (B) image in the second comparison image are displayed in this order (indicated by "WRB" in FIG. 9D). In addition, images are displayed in the fourth area A4 in order of "WGR", in the fifth area A5 in order of "WGG", in the sixth area A6 in order of "WGB", in the seventh area A7 in order of "WBR", in the eighth area A8 in order of "WBG", and in the ninth area A9 in order of "WBB".

FIG. 10 illustrates an example of the color-determination table created in step S18 and used to determine a measurement position in step S45.

In step S44, for example, as a result of the normalization of the measurement results of the first comparison image by the measurement results of the reference image, it is determined that the color of a first detection image is red (R), and, as a result of the normalization of the measurement results of the second comparison image by the measurement results of the reference image, it is determined that the color of a second detection image is red (R). In this case, in step S45, it is determined that the measurement position of the color measurement device 100 is the first area A1. In this way, if it is determined that the color of the first detection image is one of red (R), green (G), and blue (B) and that the color of the second detection image is also one of red (R), green (G), and blue (B), it is determined that the measurement position of the color measurement device 100 is one of the first to ninth areas A1 to A9.

Furthermore, in step S44, for example, it is determined that the color of the first detection image is red (R) and that the color of the second detection image is yellow (Y) as a mix of red (R) and green (G). In this case, in step S45, it is determined that the measurement position of the color measurement device 100 is a portion extending across the first area A1 and the second area A2 (indicated by "A1-A2" in FIG. 10). In this way, if it is determined that the color of the first detection image is one of red (R), green (G), and blue (B) and that the color of the second detection image is yellow (Y) as a mix of red (R) and green (G) or is cyan (C) as a mix of green (G) and blue (B), it is determined that the measurement position of the color measurement device 100 includes two areas adjacent in the horizontal direction among the first to ninth areas A1 to A9.

Furthermore, in step S44, for example, it is determined that the color of the first detection image is yellow (Y) as a mix of red (R) and green (G) and that the color of the second detection image is red (R). In this case, in step S45, it is determined that the measurement position of the color measurement device 100 is a portion extending across the first area A1 and the fourth area A4 (indicated by "A1-A4" in FIG. 10). In this way, if it is determined that the color of the first detection image is yellow (Y) as a mix of red (R) and green (G) or is cyan (C) as a mix of green (G) and blue (B) and that the color of the second detection image is one of red (R), green (G), and blue (B), it is determined that the measurement position of the color measurement device 100 includes two areas adjacent in the vertical direction among the first to ninth areas A1 to A9.

Furthermore, in step S44, for example, it is determined that the color of the first detection image is yellow (Y) as a mix of red (R) and green (G) and that the color of the second detection image is yellow (Y) as a mix of red (R) and green (G). In this case, in step S45, it is determined that the measurement position of the color measurement device 100 is a portion extending across the first, second, fourth, and fifth areas A1, A2, A4, and A5 (indicated by "A1-A2-A4-A5" in FIG. 10). In this way, if it is determined that the color of the first detection image is yellow (Y) as a mix of red (R) and green (G) or is cyan (C) as a mix of green (G) and blue (B) and that the color of the second detection image is yellow (Y) as a mix of red (R) and green (G) or is cyan (C) as a mix of green (G) and blue (B), it is determined that the measurement position of the color measurement device 100 includes four areas adjacent in the vertical direction and adjacent in the horizontal direction among the first to ninth areas A1 to A9.

FIG. 11 illustrates an example of a setting table that is used for the setting of determination criteria, or criteria on which color determination is based, in step S14 and the setting of gradation signal values in step S15 if a positive determination is made in step S12 illustrated in FIG. 5, that is, if the characteristics to be used for the determination of the measurement position are defined. In the illustrated example, in step S11, chroma C and hue H (in degrees (°)) are set as characteristics, and the characteristic values of chroma C and hue H are defined (or have been acquired).

In the example illustrated in FIG. 11, there are set six determination criteria for chroma C in the range of more than one-half the maximum value (C>maximum value/2) and in the range of not more than one-half the maximum value (C≤maximum value/2) in combination with three determination criteria for hue H in the ranges of 0 to 90, 90 to 180, and 180 to 360. In the condition where the chroma C is more than one-half the maximum value, the gradation signal values to be used are set to R=255, G=0, and B=0 for the hue H in the range of 0 to 90, the gradation signal values to be used are set to R=0, G=255, and B=0 for the hue H in the range of 90 to 180, and the gradation signal values to be used are set to R=0, G=0, and B=255 for the hue H in the range of 180 to 360. In the condition where the chroma C is less than or equal to one-half the maximum value, the gradation signal values to be used are set to R=64, G=0, and B=0 for the hue H in the range of 0 to 90, the gradation signal values to be used are set to R=0, G=64, and B=0 for the hue H in the range of 90 to 180, and the gradation signal values to be used are set to R=0, G=0, and B=64 for the hue H in the range of 180 to 360.

In the foregoing description, by way of example, the measurement position of the color measurement device 100 on the display screen 31 is not defined. As an alternative, the measurement position of the color measurement device 100 on the display screen 31 may be set in advance, and it may be determined whether the color measurement device 100 has performed measurement of the set measurement position. The measurement position of the color measurement device 100 on the display screen 31 may be set in advance in the following two situations: (1) when the color measurement device 100 has not previously performed measurement and the color measurement device 100 is to perform measurement of a desired predetermined measurement position, and (2) when the color measurement device 100 has previously performed measurement and the color measurement device 100 is to perform measurement of the same measurement position as that in the previous measurement. The measurement position may be set by, for example, receiving input of a measurement position (information about the coordinates on the display screen 31) using the input device 40 or by, for example, storing the previous measurement position in the storage unit 250 and reading the stored measurement position.

FIG. 12 illustrates an example of a setting table that is used to determine whether the color measurement device 100 has performed measurement of a measurement position. In the illustrated example, hues H (in degrees (°)) are set as characteristics.

In the example illustrated in FIG. 12, there are set two determination criteria for hue H in the ranges of 0 to 80 and 100 to 180. For the hue H in the range of 0 to 80, the gradation signal values to be used are set as follows: R=255, G=0, and B=0. In this case, the determined color is red (R). For the hue H in the range of 100 to 180, the gradation signal values to be used are set as follows: R=0, G=255, and B=0. In this case, the determined color is green (G).

Figures 13A, 13B:
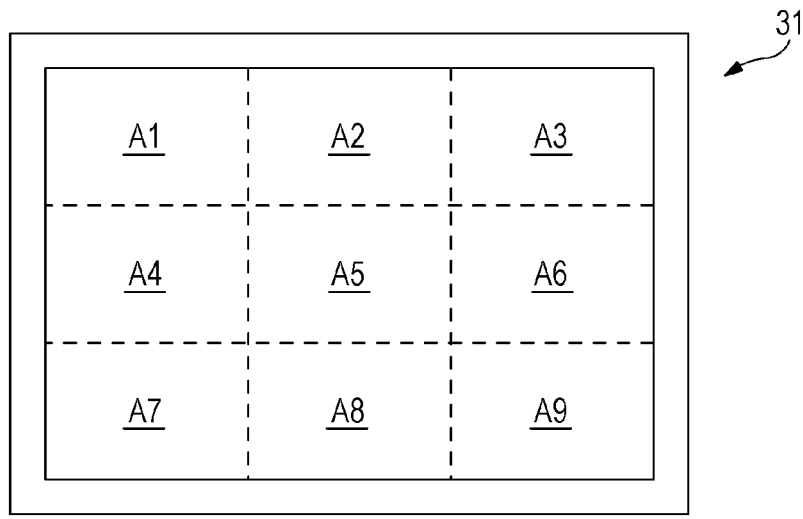
FIGS. 13A and 13B illustrate an example of position-detection image data created in accordance with determination criteria and gradation signal values illustrated in FIG. 12.

FIGS. 13A and 13B illustrate an example of position-detection image data created in accordance with the determination criteria and gradation signal values illustrated in FIG. 12. FIG. 13A illustrates the division of the display screen 31 into areas, and FIG. 13B illustrates the configuration of the position-detection image data.

As illustrated in FIG. 13A, also in the illustrated example, the entire area of the display screen 31 is divided into nine areas (the first to ninth areas A1 to A9) of three rows and three columns. In the illustrated example, among the first to ninth areas A1 to A9 arranged in a matrix, the fifth area A5 located at the center in the vertical direction and the horizontal direction is set as the target measurement position (the area of which the color measurement device 100 is to perform measurement).

As illustrated in FIG. 13B, the position-detection image used in the illustrated example includes a reference image and a comparison image. In the illustrated example, the comparison image includes one comparison image rather than multiple comparison images.

Of these images, the reference image is configured such that, similarly to the example described above, the gradation signal values (R=255, G=255, B=255) for displaying a white (W) color are set for the entire area of the display screen 31, that is, the first to ninth areas A1 to A9. In the reference image, therefore, the entire area of the display screen 31 has the same color.

In the comparison image, in contrast, the gradation signal values (R=255, G=0, B=0) for displaying a red (R) color are set for the fifth area A5 of the display screen 31, which is the target measurement position, and the gradation signal values (R=0, G=255, B=0) for displaying a green (G) color are set for the other areas, namely, the first to fourth and sixth to ninth areas A1 to A4 and A6 to A9. In the comparison image, therefore, the entire area of the display screen 31 has multiple (in this example, two) different colors (in this example, red (R) and green (G)).

Figure 14A:
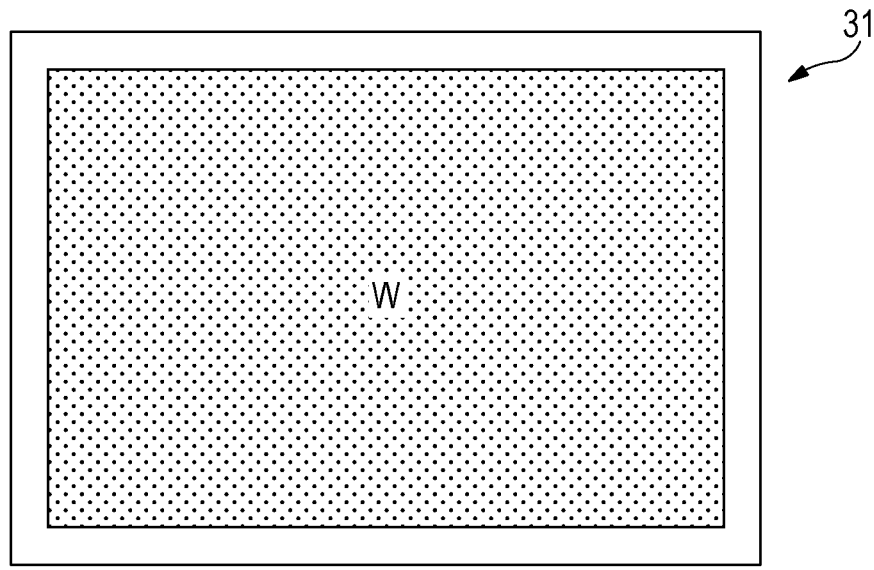
FIGS. 14A and 14B illustrate a position-detection image displayed on the display screen of the display device in accordance with the position-detection image data illustrated in FIG. 13B.
Figure 14B:
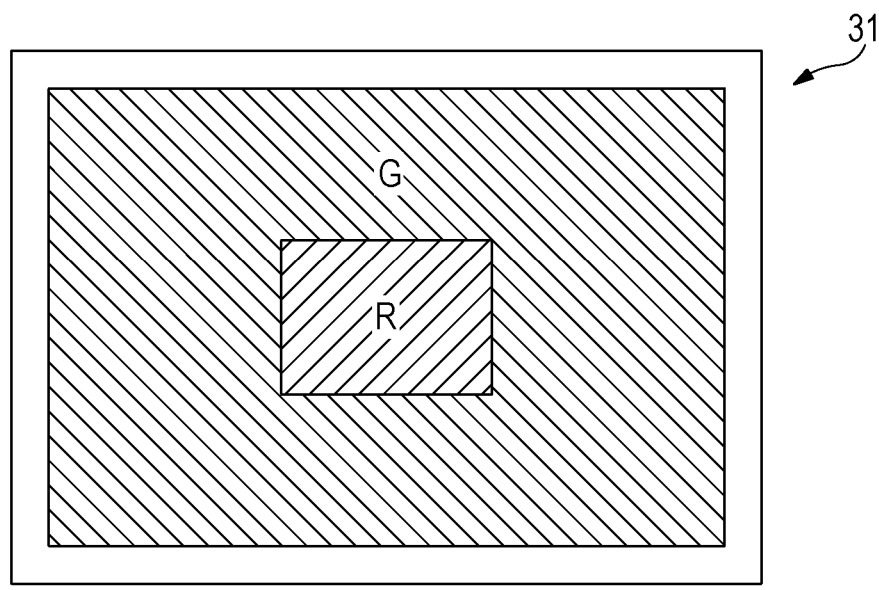

FIGS. 14A and 14B illustrate position-detection images displayed on the display screen 31 of the display device 30 in step S20 in accordance with the position-detection image data illustrated in FIG. 13B. FIG. 14A illustrates the reference image displayed on the display screen 31, and FIG. 14B illustrates the comparison image displayed on the display screen 31.

In the illustrated example, the display device 30 displays the reference image illustrated in FIG. 14A and the comparison image illustrated in FIG. 14B on the display screen 31, in this order, in accordance with the position-detection image data acquired from the computer device 20. The images may be displayed in different order.

In the illustrated example, it is determined that the color of the detection image is red (R) while the color measurement device 100 performs measurement of the fifth area A5, and that the color of the detection image is green (G) while the color measurement device 100 performs measurement of any one of the first to fourth and sixth to ninth areas A1 to A4 and A6 to A9. While the color measurement device 100 performs measurement of a portion extending across the fifth area A5 and any one of the first to fourth and sixth to ninth areas A1 to A4 and A6 to A9, it is determined that the color of the detection image is red (R) and green (G).

Accordingly, if red (R) is identified as a color, it is determined that the color measurement device 100 is performing measurement of the target measurement position (in this example, in the fifth area A5), whereas, if green (G) or yellow (Y) as a mix of red (R) and green (G) is identified as a color, it is determined that the color measurement device 100 is performing measurement of an area off the target measurement position.

In this exemplary embodiment, therefore, a reference image including one achromatic image and a comparison image including two or more images including a chromatic image are sequentially displayed on the display screen 31 using the display device 30, and the measurement position of the color measurement device 100 on the display screen 31 is determined in accordance with the results of sequentially reading the reference image and comparison image displayed on the display screen 31 using the color measurement device 100. In this exemplary embodiment, the comparison image includes multiple chromatic images. In a case where one comparison image is read using the color measurement device 100, the color of the image read using the color measurement device 100 may vary depending on the measurement position of the color measurement device 100. Thus, the time taken to determine a measurement position on the display screen 31 may be reduced. In the comparison image, any one of the two or more images including a chromatic image may be an achromatic image.

In the foregoing description, by way of example, hue alone or a combination of chroma and hue is used as the characteristics to be used for the discrimination of colors in the determination of the measurement position. However, this is not to be taken in a limiting sense. For example, a combination of two or three parameters among chroma, hue, and lightness may be used as the characteristics. The ratio of tristimulus values X, Y, and Z to a reference value or any other suitable parameter may also be used as the characteristics.

In the foregoing description, furthermore, the display screen 31 is divided into nine areas (the first to ninth areas A1 to A9) using the combination of two comparison images (first comparison image and second comparison image). If it is possible to form a single comparison image using, for example, nine chromatic images of different colors, a display screen may be divided into nine areas using one such comparison image. A comparison image may be formed using three or more images.

In the foregoing description, furthermore, by way of example, the display screen 31 is divided into nine areas (the first to ninth areas A1 to A9). The number of areas into which the display screen 31 is divided may be any value greater than or equal to two, and these areas may not necessarily have the same size. For improvement in the detection accuracy of the measurement position, it is desirable that the number of areas into which the display screen 31 is divided increase in accordance with an increase in the size of the display screen 31.

In this exemplary embodiment, furthermore, the reference image is a white image (R=255, G=255, B=255). However, this is not to be taken in a limiting sense. An image of an achromatic color other than white (for example, R=127, G=127, B=127) may be used. It is desirable that the reference image not be a black image (R=0, G=0, B=0).

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A measurement position determination apparatus comprising:
   a measurement unit, including a sensor, configured to measure a displayed reference image and a displayed comparison image in a sub-area on a display screen, the displayed reference image and the displayed comparison image being displayed on the display screen in accordance with a display image data; and
   a processor configured to execute:
   a creation unit configured to create the display image data for displaying a reference image and a comparison image on the display screen, the reference image including one achromatic image, the comparison image being formed by arranging two or more images including a chromatic image; and
   a determination unit configured to determine a measurement position of the measurement unit on the display screen in accordance with measurement results obtained by measurement of the displayed reference image and the displayed comparison image by the measurement unit,
   wherein the creation unit is configured to create the display image data using a first comparison image and a second comparison image as the comparison image, the first comparison image being formed by arranging two or more images including a chromatic image in a first arrangement, the second comparison image being formed by arranging the same two or more images including the chromatic image in a second arrangement different from the first arrangement.

2. The measurement position determination apparatus according to claim 1, wherein the creation unit is configured to create the display image data using a white image as the displayed reference image.

3. The measurement position determination apparatus according to claim 2, wherein the determination unit is configured to determine the color of the display comparison image in accordance with a result of normalization of a measurement result obtained by measurement of the displayed comparison image by a measurement result obtained by measurement of the reference image, and is configured to determine a measurement position of the measurement unit on the display screen in accordance with a determined color.

4. The measurement position determination apparatus according to claim 3, wherein the creation unit is configured to create the display image data using chromatic images having at least different hues as the two or more images in the displayed comparison image.

5. The measurement position determination apparatus according to claim 2, wherein the creation unit is configured to create the display image data using chromatic images having at least different hues as the two or more images in the displayed comparison image.

6. The measurement position determination apparatus according to claim 1, wherein the determination unit is configured to determine the color of the comparison image in accordance with a result of normalization of a measurement result obtained by measurement of the displayed comparison image by a measurement result obtained by measurement of the displayed reference image, and is configured to determine a measurement position of the measurement unit on the display screen in accordance with a determined color.

7. The measurement position determination apparatus according to claim 6, wherein the creation unit is configured to create the display image data using chromatic images having at least different hues as the two or more images in the displayed comparison image.

8. The measurement position determination apparatus according to claim 1, wherein the creation unit is configured to create the display image data using chromatic images having at least different hues as the two or more images in the displayed comparison image.

9. An image display system comprising:
   a display configured to display a reference image and a comparison image on a display screen in accordance with a display image data;
   a measurement unit, including a sensor, configured to measure a displayed reference image and a displayed comparison image in a sub-area on the display screen, the displayed reference image and the displayed comparison image being displayed on the display screen in accordance with the display image data; and
   a processor configured to execute:
   a creation unit configured to create the display image data for displaying the reference image and the comparison image on the display screen, the reference image including one achromatic image, the comparison image being formed by arranging two or more images including a chromatic image; and
   a determination unit configured to determine a measurement position of the measurement unit on the display screen in accordance with measurement results obtained by measurement of the displayed reference image and the displayed comparison image by the measurement unit,
   wherein the creation unit is configured to create the display image data using a first comparison image and a second comparison image as the comparison image, the first comparison image being formed by arranging two or more images including a chromatic image in a first arrangement, the second comparison image being formed by arranging the same two or more images including the chromatic image in a second arrangement different from the first arrangement.

10. A non-transitory computer readable medium storing a program causing a computer to execute a process, the process comprising:
    creating display image data for displaying a reference image and a comparison image on a display screen, the reference image including one achromatic image, the comparison image being formed by arranging two or more images including a chromatic image; and
    determining a measurement position on the display screen in accordance with measurement results obtained by measurement of the reference image and the comparison image in a sub-area on the display screen, the reference image and the comparison image being displayed on the display screen in accordance with the display image data,
    wherein the display image data is created using a first comparison image and a second comparison image as the comparison image, the first comparison image being formed by arranging two or more images including a chromatic image in a first arrangement, the second comparison image being formed by arranging the same two or more images including the chromatic image in a second arrangement different from the first arrangement.

* * * * *